(12) United States Patent
Wilkinson et al.

(10) Patent No.: US 9,970,290 B2
(45) Date of Patent: May 15, 2018

(54) BOREHOLE LOGGING METHODS AND APPARATUS

(71) Applicant: DEEP EXPLORATION TECHNOLOGIES COOPERATIVE RESEARCH CENTRE LTD., Adelaide Airport (AU)

(72) Inventors: Brett James Wilkinson, Wembley Downs (AU); Gordon Henderson Stewart, Claremont (AU); Jerome Christian Dupuis, Quebec (CA); Anton Kepic, Booragoon (AU)

(*) Notice: Subject to any disclaimer, the term of this patent is extended or adjusted under 35 U.S.C. 154(b) by 0 days. days.

(21) Appl. No.: 15/037,130

(22) PCT Filed: Nov. 19, 2014

(86) PCT No.: PCT/AU2014/001063
§ 371 (c)(1),
(2) Date: May 17, 2016

(87) PCT Pub. No.: WO2015/074101
PCT Pub. Date: May 28, 2015

(65) Prior Publication Data
US 2016/0273352 A1 Sep. 22, 2016

(30) Foreign Application Priority Data
Nov. 19, 2013 (AU) .................... 2013904475

(51) Int. Cl.
*E21B 47/00* (2012.01)
*E21B 49/00* (2006.01)
(Continued)

(52) U.S. Cl.
CPC .............. *E21B 49/00* (2013.01); *E21B 47/00* (2013.01); *E21B 47/04* (2013.01); *E21B 47/06* (2013.01);
(Continued)

(58) Field of Classification Search
CPC ........................................................ E21B 49/00
See application file for complete search history.

(56) References Cited

U.S. PATENT DOCUMENTS 4,596,139 A 6/1986 Gournay
5,813,480 A 9/1998 Zaleski, Jr. et al.
(Continued)

FOREIGN PATENT DOCUMENTS

AU 2012346426 A1 7/2014
AU 2012397856 A1 3/2015
(Continued)

OTHER PUBLICATIONS

International Search Report dated Dec. 19, 2014 for application PCT/AU2014/001063, filed on Nov. 19, 2014 and published as WO 2015/074101 dated May 28, 2015 (Applicant—Deep Exploration Tech. Coop. Research Centre, Ltd. // Inventor—Wilkinson, et al.) (5 pages).
(Continued)

*Primary Examiner* — David Porta
*Assistant Examiner* — Hugh H Maupin
(74) *Attorney, Agent, or Firm* — Ballard Spahr LLP

(57) ABSTRACT

A method utilized in borehole logging, such as in surveying or exploration relating to a subsurface formation. The method includes deploying a logging instrument that includes a pressure sensor into a borehole drilled into the formation. The method includes the steps of obtaining a first pressure value at a first depth in the borehole, obtaining at least one further pressure value subsequent to the first pressure value during withdrawing or advancing the logging instrument in the borehole, and determining one or more characteristics of the subsurface formation, utilizing at least one of the further pressure values, or a change in pressure ($\Delta p$) between the first pressure value and a said further (Continued)

pressure value or values, or a change in pressure (Δρ) between a said further pressure value and another said further pressure value, or a combination of two or more of such values.

20 Claims, 2 Drawing Sheets

(51) Int. Cl.
    *E21B 47/04*       (2012.01)
    *E21B 47/06*       (2012.01)
    *G01V 5/12*        (2006.01)
    *E21B 25/00*      (2006.01)
    *E21B 47/09*      (2012.01)

(52) U.S. Cl.
    CPC ............... *G01V 5/12* (2013.01); *E21B 25/00* (2013.01); *E21B 47/09* (2013.01)

(56) References Cited

U.S. PATENT DOCUMENTS

| | | | |
|---|---|---|---|
| 5,896,939 A | 4/1999 | Witte | |
| 6,058,771 A | 5/2000 | Johnson et al. | |
| 6,145,378 A | 11/2000 | McRobbie et al. | |
| 6,151,961 A | 11/2000 | Huber et al. | |
| 6,189,612 B1 | 2/2001 | Ward | |
| 6,349,768 B1 | 2/2002 | Leising | |
| 6,401,812 B2 | 6/2002 | Leising | |
| 6,401,838 B1 | 6/2002 | Rezmer-Cooper | |
| 6,427,785 B2 | 8/2002 | Ward | |
| 6,464,021 B1 | 10/2002 | Edwards | |
| 6,516,663 B2 | 2/2003 | Wong | |
| 6,536,522 B2 | 3/2003 | Birckhead et al. | |
| 6,693,554 B2 | 2/2004 | Beique et al. | |
| 6,910,388 B2 | 6/2005 | Jones | |
| 6,923,052 B2 | 8/2005 | Krueger et al. | |
| 7,046,165 B2 | 5/2006 | Beique et al. | |
| 7,063,174 B2 | 6/2006 | Chemali et al. | |
| 7,107,860 B2 | 9/2006 | Jones | |
| 7,114,579 B2 | 10/2006 | Hutchinson | |
| 7,173,542 B2 | 2/2007 | Beique et al. | |
| 7,207,396 B2 | 4/2007 | Hall et al. | |
| 7,219,730 B2 | 5/2007 | Tilton et al. | |
| 7,331,223 B2 | 2/2008 | Zazovsky | |
| 7,353,869 B2 | 4/2008 | Wetzel et al. | |
| 7,458,273 B2 | 12/2008 | Skinner et al. | |
| 7,458,420 B2 | 12/2008 | Rioufol et al. | |
| 7,542,853 B2 | 6/2009 | Lapierre et al. | |
| 7,694,558 B2 | 4/2010 | Zaeper et al. | |
| 7,696,900 B2 | 4/2010 | Hall et al. | |
| 7,765,862 B2 | 8/2010 | Flaum | |
| 7,768,423 B2 | 8/2010 | Camwell et al. | |
| 7,857,046 B2 | 12/2010 | Lovell et al. | |
| 7,950,472 B2 | 5/2011 | DiFoggio et al. | |
| 7,962,288 B2 | 6/2011 | Gleitman | |
| 7,966,875 B2 | 6/2011 | Proett et al. | |
| 8,042,624 B2 | 10/2011 | Quernheim et al. | |
| 8,051,910 B2 | 11/2011 | Augustine | |
| 8,086,431 B2 | 12/2011 | Caldera | |
| 8,136,591 B2 | 3/2012 | Del Campo et al. | |
| 8,171,989 B2 | 5/2012 | Goode et al. | |
| 8,210,036 B2 | 7/2012 | Bekkeheien | |
| 8,305,228 B2 | 11/2012 | Vigneaux | |
| 8,407,006 B2 | 3/2013 | Gleitman | |
| 8,443,915 B2 | 5/2013 | Storm, Jr. et al. | |
| 8,453,760 B2 | 6/2013 | Fincher et al. | |
| 8,600,679 B2 | 12/2013 | Zaeper et al. | |
| 8,636,060 B2 | 1/2014 | Hernandez | |
| 8,781,746 B2 | 7/2014 | Schneider et al. | |
| 8,899,322 B2 | 12/2014 | Cresswell et al. | |
| 8,973,433 B2 | 3/2015 | Mulford | |
| 9,016,119 B2 | 4/2015 | Badri et al. | |
| 2003/0000300 A1 | 1/2003 | Wong | |
| 2003/0080743 A1* | 5/2003 | Das | G01V 11/00 324/338 |
| 2005/0194184 A1 | 9/2005 | Gleitman | |
| 2005/0257611 A1 | 11/2005 | Fogal et al. | |
| 2006/0225880 A1 | 10/2006 | Radzinski et al. | |
| 2010/0018703 A1 | 1/2010 | Lovell et al. | |
| 2011/0185806 A1* | 8/2011 | Pfutzner | G01V 7/06 73/152.54 |
| 2012/0305313 A1 | 12/2012 | DiFoggio | |
| 2013/0025359 A1 | 1/2013 | Cartellieri et al. | |
| 2013/0047696 A1 | 2/2013 | Rasmus et al. | |
| 2013/0048380 A1 | 2/2013 | Rasmus et al. | |
| 2013/0049983 A1 | 2/2013 | Rasmus et al. | |
| 2013/0054146 A1 | 2/2013 | Rasmus et al. | |
| 2013/0087388 A1 | 4/2013 | Veeningen | |
| 2013/0090854 A1 | 4/2013 | Rasmus et al. | |
| 2013/0090855 A1 | 4/2013 | Rasmus et al. | |
| 2013/0256033 A1 | 10/2013 | Gleitman | |
| 2014/0020953 A1 | 1/2014 | Chau et al. | |
| 2014/0102698 A1 | 4/2014 | Bergman | |
| 2014/0110575 A1 | 4/2014 | Miles et al. | |
| 2014/0332270 A1 | 11/2014 | O'Dell, II et al. | |
| 2014/0353037 A1* | 12/2014 | Rasmus | E21B 47/04 175/45 |
| 2014/0367169 A1 | 12/2014 | Wheater et al. | |
| 2015/0021020 A1 | 1/2015 | Whittaker et al. | |
| 2015/0090445 A1 | 4/2015 | Miller et al. | |
| 2015/0185715 A1 | 7/2015 | McHugh | |

FOREIGN PATENT DOCUMENTS

| | | |
|---|---|---|
| AU | 2012397805 A1 | 6/2015 |
| CA | 226844 A | 12/1922 |
| CA | 2215888 A1 | 3/1999 |
| CA | 2774276 A1 | 3/2011 |
| CA | 2885500 A1 | 3/2014 |
| WO | WO-2001/042622 A1 | 6/2001 |
| WO | WO-2004/076815 A1 | 9/2004 |
| WO | WO-2007/093793 A1 | 8/2007 |
| WO | WO-2010/002270 A2 | 1/2010 |
| WO | WO-2012/087864 A2 | 6/2012 |
| WO | WO-2013/137742 A1 | 9/2013 |
| WO | WO-2014/022384 A1 | 2/2014 |
| WO | WO-2014/078027 A2 | 5/2014 |
| WO | WO-2014/190252 A1 | 11/2014 |
| WO | WO-2015/024814 A2 | 2/2015 |
| WO | WO-2015/026424 A1 | 2/2015 |
| WO | WO-2015/038179 A1 | 3/2015 |
| WO | WO-2015/067931 A2 | 5/2015 |

OTHER PUBLICATIONS

Written Opinion dated Dec. 19, 2014 for application PCT/AU2014/001063, filed on Nov. 19, 2014 and published as WO 2015/074101 dated May 28, 2015 (Applicant—Deep Exploration Tech. Coop. Research Centre, Ltd. // Inventor—Wilkinson, et al.) (6 pages).
Supplementary Search Report and Written Opinion dated Jul. 12, 2017 by the European Patent Office for Patent Application No. 14864467.7, which was filed on Nov. 19, 2014 and published as EP 3071789 dated Sep. 28, 2016 (Inventor—Wilkinson et al.; Applicant—Deep Exploration Technologies Cooperative Res. Centre, Ltd.) (5 pages).

* cited by examiner

BOREHOLE LOGGING METHODS AND APPARATUS

FIELD OF THE INVENTION

The present invention relates to borehole logging methods and apparatus, such as for survey or exploration relating to subsurface formations.

CROSS REFERENCE

This application claims priority from Australian provisional patent application 2013904475 filed on 19 Nov. 2013, the contents of which are to be taken as incorporated herein by this reference.

BACKGROUND TO THE INVENTION

Borehole logging is the method of making measurements and recording information about formations of the subsurface geology and/or the depth and angles of the borehole from the surface.

A log is recorded by visual inspection of rock samples from core samples extracted from the borehole and/or geophysical information obtained by one or more instruments lowered into the hole after the hole is drilled i.e. in an open hole.

Typically, the instrument recording the log is lowered into the hole using a winch. Logging is performed in boreholes drilled for mineral or oil and gas exploration or during groundwater geothermal, environmental or geotechnical surveying.

'Wire-line' logging is done in an open hole to acquire a complete picture of the rock properties of the subsurface formations. This information helps drilling operators and geologists to make decisions about drilling direction, presence/absence and direction of the resource being sought, or mining production.

A wire-line instrument is lowered down the hole to a chosen depth so that the petro-physical properties of formations can be captured and stored in a memory device for later analysis.

One or more sensors associated with the instrument can be activated to measure electrical, electromagnetic, natural gamma radiation levels or acoustic information to build a series of overlayed logs.

Traditional logging tools are connected via a cable connection that provides power and also provides a conduit to capture data in real time or raw data from the instrument is fed to a data acquisition system for later analyses.

Open hole logs are usually run before a hole is lined or cased off and they are managed by a costly technical team. Open hole survey costs are extremely high for the miner or explorer. Therefore, only a few holes can be logged, limiting the information available to a geologist when making drilling decisions.

'Logging while drilling' (LWD) technique has been pioneered in the oil and gas industry. LWD and also 'measure while drilling' (MWD) logs typically use mud pulse technology to transmit data from the downhole tool/instrument in the borehole for onward transmission to the surface for continuous analysis.

This technique provides the same information as wire-line logging, however, instead of lowering the instrument into the borehole on a winched cable, the required sensors are embedded in the drill string and the measurements are fed to the operator at the surface in real time to allow the drilling operators and geologist to obtain logs as well as information such as hole direction, weight on bit etc.

Data rates are slow (10 bits a second) and it is necessary to use data compression techniques and buffering to the tool's on board memory. Slow data transfer rates, complex technology to pass the data in any reliable way through mud pulses, and the need for a costly site technical team makes the use of such mud pulse technology undesirable. It has been realised that a more efficient data gathering methodology is desirable.

Geophysical methods can be used to interrogate a larger expanse of subsurface formations and can be used in conjunction with geological information from core samples to build a better geological prediction of the formations surrounding the core holes.

A geophysical measuring instrument, commonly referred to as a logging instrument or sonde, is lowered into the bore hole to collect relevant data. A sonde is essentially a 'probe' in the form, for example, of an electronic instrument arranged to sense one or more parameters or characteristics.

Logging instruments are already used in oil field operations to obtain information about the bore hole. This process is referred to as "logging". Logging can be performed by "wireline logging", "logging while drilling" (LWD) and "through-the-bit logging" after drilling has occurred.

In wireline logging, a logging instrument is lowered into the bore hole after the drill string has been extracted. The logging instrument hangs and is supported by a length of cable or "wireline". Additionally, the wireline facilitates the electrical and communication connections between the logging instrument and the related equipment normally located at ground level.

In LWD the actual drilling assembly includes sensing instruments that measure required parameters as the bore hole is being drilled. Such sensing instruments are thus subject to the hostile downhole environment and consequently their operation is often compromised.

Through-the-bit logging involves introducing a logging instrument, for example a wireline tool, into the borehole through a central port in the drill bit located at the downhole end of the drill string. The logging instrument is lowered or pumped into the borehole through the interior passage of the drill string. The logging instrument is then passed through the port in the drill bit to enable logging of the borehole below the drill bit. Further, the instrument can be used to log the length of the borehole as the drill string is pulled out of the borehole. This process is often referred to as "logging while tripping".

U.S. Pat. No. 8,443,915 describes different through-the-bit logging systems used for logging well bores drilled to extract crude oil and/or natural gas. As shown in FIGS. 1B and 1C of U.S. Pat. No. 8,443,915, a bottom hole assembly (BHA) includes a mill bit, a mud motor, a logging tool, a centralizer, a hanger and a disconnect. Once the well bore has been drilled to the required depth, the mill bit is used to cut through the nose of the drill bit to establish the port for the logging tool to pass through. The BHA is lowered through the bore of the drill string until the hanger is seated against an adapter of the drill bit.

Although logging instruments are used in oil and gas drilling operations, the use of such instruments has not readily translated to core sampling operations. This is due to the costs associated with providing specialist technicians and equipment at sampling sites to collect and record geophysical data.

The discussion of the background to the invention herein is included to explain the context of the invention. This is not to be taken as an admission that any of the material referred to was published, known or part of the common general knowledge as at the priority date of this application.

One or more forms of the present invention seeks to provide at least a method and/or logging instrument that enables geophysical data collection as part of a core sampling process, preferably utilising at least part of the drill rig equipment associated with core sampling.

One or more forms of the present invention has/have been developed with the aforementioned problems in the known art in mind.

It has been found desirable to develop geophysical logging apparatus and/or one or more methods of use and/or deployment thereof, or to develop a downhole logging method, that can be utilised or employed by drill operators/personnel as part of their normal operations without the need for additional specialist geophysical logging personnel.

Utilising the drill rig personnel/operators removes the need for specialist personnel and avoids interrupting drilling operations or avoids delays in otherwise waiting for specialist personnel to arrive on site after drilling. Logging operations can advantageously be carried out by the drill operators/personnel who require less training or specialisation.

Such an approach to drill logging operations is desirable in that it helps reduce the significant costs associated with exploration of subsurface formations, and is intended to also lower the barrier to adoption of the technology in a sector that is historically conservative to new technology and methods of working.

SUMMARY OF THE INVENTION

With the aforementioned in mind, an aspect of the present invention provides a method utilised in borehole logging, such as in surveying or exploration relating to a subsurface formation, the method including:
a) deploying a logging instrument into a borehole drilled into the formation, the instrument including a pressure sensor;
b) obtaining a first pressure value at a first depth in the borehole;
c) obtaining at least one further pressure value subsequent to the first pressure value during withdrawing the logging instrument from borehole;
d) in determining one or more characteristics of the subsurface formation, utilising:
  i. at least one of the further pressure values; or
  ii. a change in pressure ($\Delta p$) between the first pressure value and a said further pressure value or values; or
  iii. a change in pressure ($\Delta p$) between a said further pressure value and another said further pressure value; or
  iv. a combination of two or more of i) to iii).

Preferably the first pressure value may be used as a reference value relative to which the further pressure value(s) is/are determined. Thus, change in pressure may be determined relative to the first pressure value as a reference value.

The first pressure value obtained by the logging instrument may be used to determine actual depth of the logging instrument at that level within the borehole. For example, the first pressure value may correlate with known data for expected pressure at known depths in a borehole.

Alternatively, if the actual depth of the logging instrument within the borehole is known or is, or can be, calculated, the first pressure value may be used as a cross reference with the known depth.

Change in pressure may be used to calculate or determine actual depth of the logging instrument in the borehole. A quantum of change in pressure or subsequent further pressure value may be compared with a previous pressure value (such as a previous further pressure value or the first pressure value) and may be used to determine actual depth of the logging instrument within the borehole.

It will be appreciated that depth within the borehole can be determined as distance along the borehole or, alternatively, a vertical distance from the surface to a point in the borehole, such as the end of the borehole or to the instrument. Preferably, for one or more forms of the present invention the depth relates to distance into the borehole from the surface or from the start of the hole.

As the logging instrument is withdrawn from the borehole, the change in depth may be calculated or determined from change in pressure relative to the reference first pressure value, which change can also be compared with removal of known length sections of the drill casing i.e. 3 meter or 6 meter lengths of casing.

A drop in pressure will be sensed each time a pressure reading is taken during withdrawal of the logging instrument from the borehole. Thus, pressure values will decrease as the logging instrument is withdrawn, and the subsequent change in pressure (lower pressure $\Delta p$) will be detected.

The logging instrument may include one or more sensors arranged and configured to project into the borehole beyond a drill bit at a distal end of the drill string.

The one or more sensors, such as one or more pressure sensors and/or accelerometer(s), may be housed in a sonde. A sonde is an instrument housing one or more sensors and used downhole to gather data.

The drill bit may have an aperture through which the sonde sensor(s) may be advanced. One or more pressure values may be sensed by the sensor(s) beyond the drill bit.

Pressure and change in pressure will be detected in fluid present in the borehole. The fluid may be a liquid, such as water or drilling mud, in a 'wet' borehole or may be one or more gases, such as air, in a 'dry' borehole.

One or more embodiments of the present invention may also include detecting acceleration. For example, the sonde may include or communicate with at least one accelerometer. Preferably, the at least one accelerometer is housed in the logging instrument or sonde.

Acceleration (or deceleration) may be used in conjunction with the first and/or further pressure values in detecting depth in the borehole. Depth values can be correlated with gamma radiation readings from one or more gamma detectors to create a log of a gamma signature of the subsurface formation. The logged signature can be used to determine the structure, such as strata and/or type(s) of rock/deposits of the subsurface formation.

The logging instrument may have an onboard power supply, and may operate autonomously when downhole. Thus, the logging instrument may record pressure and/or acceleration values during the withdrawal operation without requiring additional input from the operator at the surface.

The logging instrument may record pressure and/or acceleration, and other parameters as required, continuously or discontinuously. For example, the logging instrument may obtain or sample pressure values at predetermined time intervals, such as every 2-5 seconds, or may use detection of acceleration or lack of acceleration as a signal to obtain a next pressure value.

The pressure values may be obtained by the pressure sensor continuously, and the pressure values thus obtained may be sampled periodically. Electronics within the logging instrument may be used to sample the continuously obtained pressure values or to sample periodically from recorded pressure values within a processor or non-volatile memory of the electronics.

The logging instrument may cease sensing pressure for a period of time until acceleration is at or above a particular threshold value. It will be appreciated that acceleration can be a negative value i.e. a deceleration.

A gamma radiation detector may be provided within the downhole equipment, such as in the logging instrument, in the sonde and/or within another portion of downhole equipment, such as an electronic survey instrument, shuttle, core orientation device.

Alternatively, pressure values may be obtained for use with a downhole electronic instrument that does not have or does not use a gamma radiation detector.

Pressure values obtained during deployment or recovery of the downhole instrument may be correlated to other recorded data associated with characterising the subsurface formation. For example, the instrument may include an electronic survey instrument, shuttle, core orientation device or other probe device.

Preferably, the gamma detector is provided within the sonde to project into the borehole when advanced beyond the drill bit. This means that the gamma detector is not shielded by surrounding metal as much as it is otherwise when within the drill string. Thus, the gamma detector can be provided as a less sensitive, smaller and/or lower powered detector than would otherwise be needed if it remained surrounded by the metal walls within the drill string which otherwise severely attenuate the external gamma signal.

The aperture through the bit restricts the size/choice of gamma detector and limits the size of the detector's crystal element for detecting gamma radiation. Therefore, a larger or more numerous crystals may be employed if the gamma detector remains within the core tube because there is more width/space within the tube compared with the narrower opening through the drill bit. Larger or more numerous gamma detection crystals help to detect a greater density of gamma radiation. This can help speed up gamma radiation recording. Suitable gamma radiation detection crystals can include, for example, caesium iodide or sodium iodide.

Values of detected (natural) gamma radiation can be associated with or correlated with respective pressure value or change in pressure within the borehole.

Natural gamma results from radioactive decay of naturally occurring radio-isotopes (e.g. potassium, thorium and uranium). Density of subsurface formations may also be detected or determined, such as by correlating measured gamma radiation values with absorbed gamma radiation by the rock from a source of gamma radiation carried by the logging instrument.

Other signals may be used in combination with natural gamma signals to determine density values or estimates for the surrounding rock/formation. For example, data or values from sound signals may be used in conjunction with gamma radiation values to determine density of the surrounding formation.

It will be appreciated that detected gamma radiation signals can be used to provide an indication of the structure of the surrounding formation up to around 30 cm radius from the logging instrument or sonde or other probe carrying the gamma radiation detector.

Gamma rays emitted from the surrounding rock are absorbed by the detector, resulting in a signal indicating the amount of gamma radiation over time. Different lithological formations have varying abundance of these radioisotopes, and the log of natural gamma can be used as a lithological indicator. Referencing the measured gamma to depth in the borehole helps to give an indication of the subsurface formation (e.g. strata and formation/deposit types and position).

As the logging instrument is withdrawn up the borehole in stages (thereby producing distinct detectable pressure changes), gamma radiation can be detected and the values correlated with the respective change in pressure or the fact that a pressure change has occurred. In this way, gamma radiation and pressure can be correlated and associated with depth.

Gamma radiation gives an indication of the type of deposits or subsurface formation the gamma detector has passed through. Changes in detected gamma radiation can be used to determine or predict the types of rock or deposits present under the surface, and changes in strata or rock type as values vary.

The logging instrument or sonde can include an array of sensors to measure electrical, electromagnetic, natural gamma radiation levels and/or acoustic information. A series of logs relating to these detected values can be produced to give overlying data sets.

A gamma radiation detector can be provided as part of the logging instrument. Preferably the gamma radiation detector remains within the drill string when the pressure sensor is advanced beyond the drill bit.

Preferably, gamma radiation values may be obtained when the logging instrument has ceased movement for a period of time during the withdrawal or advancement in the borehole.

Alternatively, gamma radiation values may be obtained when the logging instrument is moving over a period of time during the withdrawal or advancement in the borehole. Preferably the rate of movement is known or estimated, such as between 1 m/min and 20 m/min, and preferably between 2 m/s and 12 m/min, and more preferably around 10 m/min. However, slower or faster movement can still be used to record useable gamma radiation values.

The obtained gamma radiation values may be correlated with pressure values to provide a gamma radiation value associated with depth positions within the borehole.

The logged gamma radiation values may be correlated with logged depth values obtained from the corresponding pressure or change in pressure values to create a lithological plan of the structure of the subsurface formation.

BRIEF DESCRIPTION OF THE DRAWINGS

At least one embodiment of the present invention will hereinafter be described with reference to the accompanying drawings, in which.

DESCRIPTION OF PREFERRED EMBODIMENT

Figure 1:
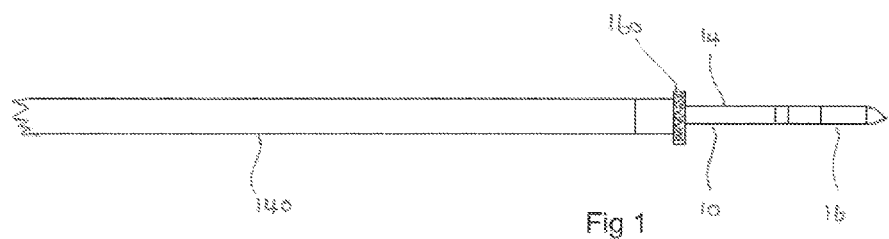
FIG. 1 shows a logging instrument deployed within a core barrel with a sonde projecting beyond the instrument's drill bit, according to an embodiment of the present invention.

One or more forms of the present invention can be employed in the following practical logging applications/apparatus:
- Wire line open hole logging: with depth encoder plus pressure sensing plus accelerometer depth correlated.
- Wire line thru the bit logging: with depth encoder plus pressure sensing plus accelerometer depth correlated.
- Core barrel coupled through the bit: similar to Wire line open hole logging and Wire line thru the bit logging above, but also coupled directly to the core barrel: with pressure sensing plus accelerometer depth correlated.
- Instrumented core barrel and/or shuttle.

It will be appreciated that embodiments of the present invention are not limited to obtaining pressure values to correlate solely with gamma radiation values. The obtained pressure values may be used in conjunction with other data gathered. For example, a downhole survey instrument, core orientation tool or shuttle may be deployed and pressure values obtained during deployment or recovery from downhole. Alternatively or in addition, other data may be obtained, such as magnetic, gravity and temperature data from down the hole can be used, correlated or combined with the obtained pressure data to aid in determining one or more characteristics of the subsurface formation.

At least one embodiment of the present invention will hereinafter be described in relation to a practical application of the embodiment following a coring operation (e.g. core sampling).

During normal coring operations, the drill bit cuts through the rock and the core is forced up into the core tube. The drill string is then pulled back at the surface and the rock is snapped from the earth. The core is taken to the surface for analysis.

After the core is removed from the tube at the surface, a logging instrument (geo-physical measuring device) is attached to the empty core tube for deployment into the hole to detect characteristics of the rock properties around the borehole.

The logging instrument is connected to the core tube using a mechanical coupler. The logging instrument is then advanced with the core tube into the borehole to record the geophysical data, e.g. gamma radiation emitted from the rock surrounding the borehole and/or borehole angle (orientation).

The core tube is usually pumped into place or dropped by a special wire line mechanism.

Advantageously, the core tube that was used to retrieve the core sample(s) is also used to deploy the logging instrument into a position where it can sense the properties of the subsurface formation in the empty hole. Thus, because the logging instrument is self contained i.e. self powered and operates autonomously once deployed, and the original core tube is re-deployed, the drill operators can deploy and retrieve the logging instrument without the need for specialist personnel or technical training. This provides significant operational cost savings by avoiding delays waiting for the specialist team to arrive. Logging can commence almost immediately after the core sample has been recovered.

The drill string (and therefore the logging instrument) is withdrawn from the borehole and each drill rod is removed at the surface. The pressure sensor within the sonde of the logging instrument senses pressure as it is withdrawn from a depth within the borehole. Changes in pressure values are used to determine change in depth.

Preferably, the logging instrument is connected to the core tube via an adapter, preferably made of stainless steel to resist corrosion and provide strength.

When downhole adjacent the drill bit, the sonde with sensors associated with the logging instrument are advanced through an aperture in the drill bit to extend into the borehole beyond the drill bit. Thus, the sensors are beyond the core barrel and drill bit.

Electronics, processing, memory and battery power components can therefore remain within the body of the logging instrument inside the core barrel, thereby protecting those logging instrument components.

Sensing, such as gamma and magnetic sensing by the sensors, is not detrimentally influenced, or at least less affected, by the steel core barrel and drill bit when the sensors project beyond the drill bit compared with the entire logging instrument remaining within the steel core barrel. However, it will be appreciated that the present invention is not limited to having the sensors project beyond the drill bit.

The logging instrument utilised in an embodiment of the present invention can do one or more of the following functions:
- automatically mode change, shut down, wake up, correlate data to depth measuring pressure and preferably also detect movement (such as acceleration/deceleration).
- store the values to non-volatile memory.

Algorithms can be employed to discard data that is not required, thereby saving vital memory space. The logging instrument can also measure survey orientation and calculate the latitude and longitude position of the data and borehole.

Embodiments of the present invention provide the drilling operator with extra data (e.g. gamma rock properties information), whilst only performing the one operation (that being a traditional magnetic/gravity dead reckoning survey). This saves time (and hence money) because only one pass is required to acquire all of the data.

One or more benefits of embodiments of the present invention are realised in that:
- logging and survey can be performed without the risk of the borehole collapsing i.e. the drill string is still in place,
- the drill operator(s) can perform the logging procedure without any additional equipment or specialist technical training or personnel,
- the logging instrument is self-powered and has autonomous operation,
- no power or signalling needs to be transmitted 'down the wire'—no risk of broken power or communication wires i.e. the logging instrument can be deployed on a simple steel wire,
- non-volatile memory storage and also data transfer can be wireless to a fit for purpose handheld device that will also control the instrument operating and test modes at the surface before deployment and after retrieval of the logging instrument, automatic depth acquisition and correlation,
automatic wire line depth counter interface,
automatic calculation of depth at any time due to input of number of rods, barrel length and stickup,
acceleration analysis to determine when a rod starts to be pulled and subsequently stops. Fine depth 'correlation'—Depth interpolation can be calculated via time interval between rod removals (rod removals involve start-stop removal of the drill string as each section of rod is unscrewed from the next one and then the drill string withdrawn another length of rod for that rod to then be unscrewed, and so on),
automatic survey operation—during the rod removal/detachment process there is a period of 'rest'. This can be used as a prompt to automatically initiate a magnetic/gravity survey to take place.

Figure 2:
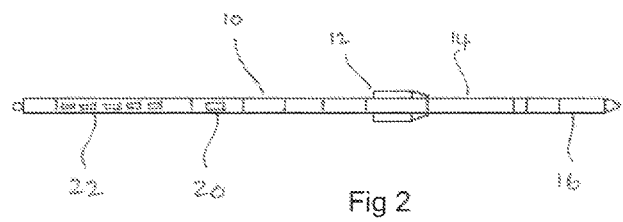
FIG. 2 shows a diagrammatic representation of the general arrangement of components within the logging instrument according to an embodiment of the present invention.

The logging instrument 10 depicted in FIGS. 1 and 2 includes a core tube adaptor or a landing collar 12, an optional spacer bar 14 when a survey is required, and a sonde 16 housing sensors. The spacer bar 14 may not be required when a gamma detector is advanced through the drill bit without a survey being required. Although only a single spacer bar 14 is depicted, multiple spacer bars 14 may be included. Preferably, three spacer bars 14 are employed.

The logging instrument 10 is an autonomous tool and as such does not require external data or power cable connections.

The logging instrument 10 includes at least one gamma radiation detector 20, which preferably remains disposed within the core barrel when the sonde portion is deployed beyond the drill bit. The gamma radiation detector 20 can be deployed anywhere in the instrument housing. The gamma radiation detector 20 may be deployed to stay within the tube to obtain higher density readings because the gamma radiation detector 20 can be larger because it does not need to project through the smaller aperture though the drill bit.

The logging instrument 20 has on-board power from batteries 22.

During normal operation, a coring rig (without the logging instrument 10 attached) is used to extract a core sample from a geological formation. Once the core sample has been extracted, logging of the core hole can occur.

The logging instrument 10 is deployed into the borehole 180. This involves a series of steps readily accomplished by the drill operator/personnel, and thus no additional specialist personnel or highly trained logging technicians are required on site.

A method of deploying the logging instrument 10 includes the steps of assembling the logging instrument 10; connecting the logging instrument 10 to the core tube of the core rig; deploying the connected core tube and logging instrument 10 through the core barrel 140 of the core rig into the borehole 180.

A further step can include seating the connected core tube and logging instrument 10 so that a lower part of the logging instrument 10 is located below the drill bit 160 on the core barrel 140.

The step of assembling the logging instrument 10 includes connecting the adaptor 12 to the core tube, connecting the spacer bar or bars 14 to the adaptor 12 and connecting the sonde 16 to the spacer bar 14.

The connected core tube 180 and logging instrument 10 is deployed through the drill string and into the core barrel 140 using a backend assembly.

Figure 3:
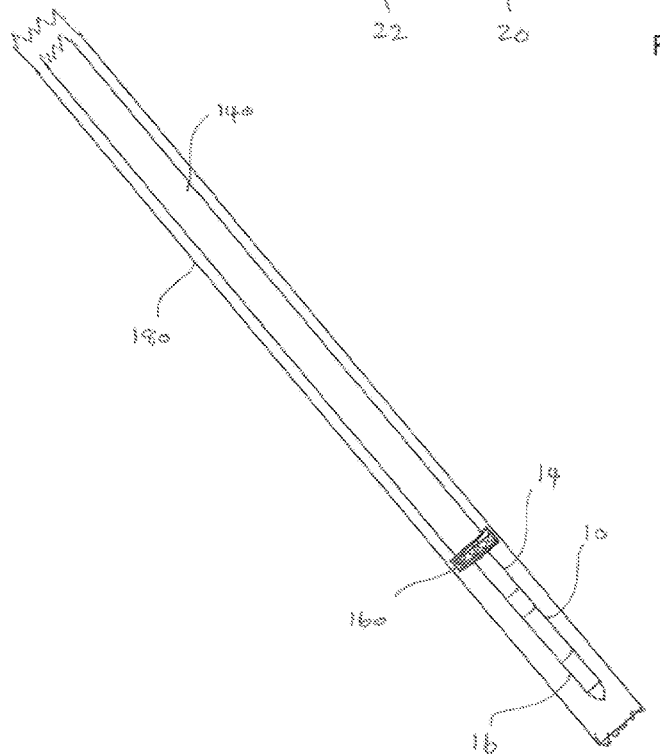
FIG. 3 shows a diagrammatic representation of the logging instrument deployed in a borehole with the sonde projecting beyond the drill bit, according to an embodiment of the present invention.

FIG. 3 shows the logging instrument 10 deployed in a section of core barrel 140 within a borehole 180.

In order to log a part of the length or the entire length of the core hole it is necessary to move the logging instrument 10 either into or out of the borehole. It will be appreciated that a preferred form of carrying out a method of the present invention is to deploy the logging instrument 10 into the borehole and gradually withdraw it whilst taking gamma radiation readings (and any other sensor readings) periodically during the withdrawal and as pressure drops due to the decreased distance into the borehole.

However, it will be appreciated that the reverse may be carried out within the scope of the present invention. That is, inserting the logging instrument 10 into the borehole and taking gamma radiation readings with the logging instrument 10 periodically or continuously as the logging instrument 10 is advanced into the borehole and therefore as pressure is increasing with distance into the borehole.

Figure 4:
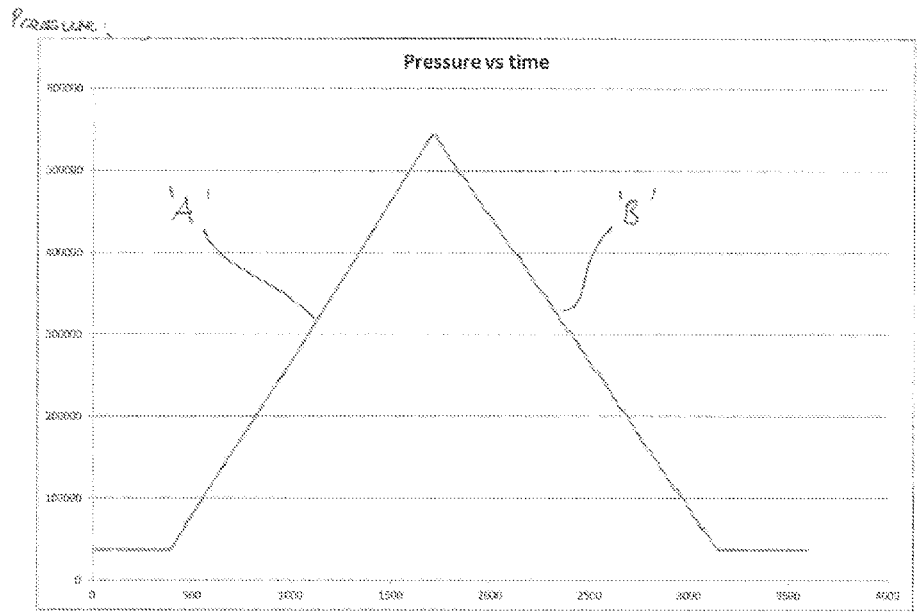
FIG. 4 shows a chart of pressure versus time for a logging instrument advanced into and subsequently withdrawn in stages from the borehole, according to an embodiment of the present invention.

FIG. 4 shows a graph of pressure against time. The logging instrument 10 is inserted into the borehole from the surface entrance at or around 400 seconds. Pressure gradually increases with depth as the logging instrument 10 advances into the borehole, up to a maximum recorded pressure (and therefore a maximum depth for this example) correlating to around 24 bar (correlating approximately to 240 m). The pressure values given on the 'y' axis are raw data values which require calibration to specific pressure units. Typically, working pressure values are 0-5000 psi, with up to around 8000 psi as a workable maximum.

It will be appreciated that pressure within a vertical borehole for a given distance will vary compared with pressure in a borehole that deviates from vertical for the same distance within the borehole. Also, pressure will typically be higher for a given distance or depth in a borehole if the fluid surrounding the pressure sensor is denser than water, for example, drilling mud has a greater density than water or air. Hence, the pressure sensor would be calibrated before deployment into the borehole.

The logging instrument 10 is gradually withdrawn from the borehole, with decreasing pressure being detected by the pressure sensor(s) housed in the logging instrument 10. Pressure is periodically static for a few seconds as the gamma radiation sensor(s) take(s) readings while the logging instrument 10 is static. The downward slope of the graph shows this as short periodic steps in the downward pressure slope to the maximum time of approximately 3150 seconds, after which pressure becomes stable, e.g. at the surface.

One or more accelerometers within the logging instrument 10 can be used to detect changes in movement of the logging instrument 10 and therefore correlate that movement (or lack thereof) with respective gamma radiation readings gathered.

Figure 5:
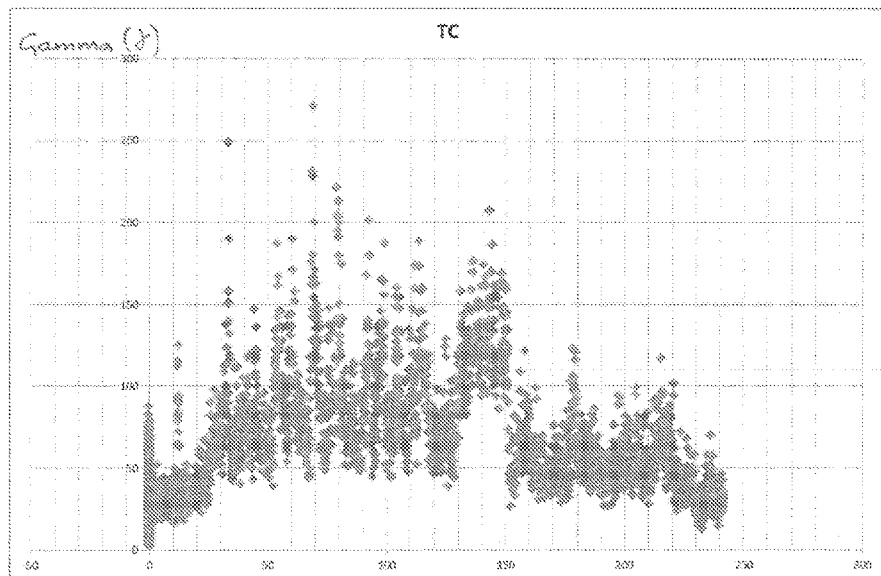
FIG. 5 shows a chart representing gamma radiation readings with respect to acceleration values according to an embodiment of the present invention.

As shown in FIG. 5, the time period used is 1 second to 3597 seconds (approximately a one hour period). This is an example only, and other periods are envisaged within the scope of the present invention.

The pressure sensor can take continuous pressure readings 9 i.e. such as when the pressure sensor is an analogue device). Those pressure readings can be sampled by electronics within the logging instrument. Sampling may be periodic, such as every few seconds or fractions of a second. Millisecond sampling can be carried out. Preferably sampling is at a rate of a sample every 0.5 seconds or less. Sampling at rates above 0.5 seconds is also envisaged.

Obtaining gamma radiation values can be at a sampled rate of every few seconds, more preferably around every second.

The initial portion of the graph 'A' shows pressure rising/ramping up as the logging instrument 10 is deployed into the borehole. Pressure increase is proportional to depth into the borehole.

The ramping down (section 'B') in FIG. 4 is the pulling out of the hole of the logging instrument 10 to a shallower depth (less pressure) and so on. The slope of the graph shows the rate of change of pressure with time.

The graphs in FIGS. 4 and 5 depict simulated rod pulls from an estimated depth of around 240 m, so the instrument 10 was pulled up and stopped for a couple of minutes, then pulled up and stopped again, and so on.

FIG. 5 shows detected natural gamma radiation from the surrounding rock formation as detected by the on-board gamma radiation detector 20 plotted against estimated depth derived from the pressure values obtained during retrieval of the logging instrument 10 back up the borehole. The pressure and depth data, and gamma signals can all be stored in an on-board non-volatile memory within the logging instrument 10 for recovery from the logging instrument 10 at the surface.

The simulated pulls are roughly 10 m/minute, equating to a typical industry logging speed of a gamma measurement. When the borehole is a dry hole (i.e. an air filled hole rather than a wet, water/drilling mud filled hole), a barometric pressure sensor can be employed to detect air pressure and changes in air pressure down hole.

The invention claimed is:

1. A method comprising:
    a) deploying a logging instrument into a borehole drilled into a formation, the instrument including a pressure sensor and being coupled to a drill string having a plurality of drill rods of known length;
    b) using the pressure sensor to obtain a first pressure value at a known depth in the borehole;
    c) using the pressure sensor to obtain at least one further pressure value subsequent to the first pressure value during withdrawing the drill string and the logging instrument from the borehole or advancing the drill string and the logging instrument in the borehole, wherein the drill string is withdrawn from the borehole or inserted into the borehole in stages to produce distinct detectable pressure changes, wherein each stage corresponds to removal or insertion of a respective known length drill rod of the drill string; and
    d) using a processor to receive the first pressure value and the at least one further pressure value obtained by the pressure sensor;
    e) determining, using the processor, an actual depth of the logging instrument within the formation, using:
        (i) a change in pressure ($\Delta\rho$) between the first pressure value and a said further pressure value or values; or
        (ii) a change in pressure ($\Delta\rho$) between a said further pressure value and another said further pressure value; or
        (iii) a combination of i) and ii),
    wherein the change in pressure ($\Delta\rho$) corresponds to a change in a length of the drill string,
    wherein the logging instrument comprises a sonde, wherein the sonde houses the pressure sensor, and wherein the sonde is advanced beyond a drill bit at a distal end of the drill string.

2. The method of claim 1, wherein the method comprises advancing the sonde at least partially through an aperture of the drill bit.

3. The method of claim 2, wherein one or more of said pressure values is/are sensed by the pressure sensor beyond the distal end of the drill bit.

4. The method of claim 1, wherein pressure and change in pressure ($\Delta\rho$) are detected in a fluid present in the borehole, the fluid being a liquid in a 'wet' borehole or gases including air in a 'dry' borehole.

5. The method of claim 1, wherein the sonde houses at least one accelerometer, and wherein the method further comprises using the at least one accelerometer to detect movement of the logging instrument.

6. The method of claim 5, wherein the sonde houses at least one geophysical data detector, the method further comprising:
    using the detected movement of the logging instrument and the first and/or further pressure values to determine the actual depth of the logging instrument; and
    correlating the actual depth of the logging instrument with detected geophysical data.

7. The method of claim 6, wherein the at least one geophysical data detector comprises a gamma radiation detector, and wherein the detected geophysical data comprises detected gamma radiation values.

8. The method of claim 6, wherein the at least one geophysical data detector comprises a magnetic sensor, and wherein the detected geophysical data comprises detected magnetic properties of the formation.

9. The method of claim 5, wherein the movement of the logging instrument is detected using acceleration data obtained from the at least one accelerometer housed within the sonde.

10. The method of claim 9, wherein the sonde houses at least one geophysical data detector, the method further comprising:
    using acceleration data and the first and/or further pressure values to determine the actual depth of the logging instrument; and
    correlating the actual depth of the logging instrument with detected geophysical data.

11. The method of claim 10, wherein the at least one geophysical data detector comprises a gamma radiation detector, and wherein the detected geophysical data comprises detected gamma radiation values.

12. The method of claim 11, wherein the gamma radiation values are obtained continuously during the withdrawal or advancement in the borehole.

13. The method of claim 11, wherein the obtained gamma radiation values are correlated with pressure values to provide a gamma radiation value associated with depth positions within the borehole.

14. The method of claim 13, further comprising correlating the logged gamma radiation values with depth values obtained from the corresponding pressure or change in pressure values to create a lithological plan of the structure of the formation.

15. The method of claim 9, wherein the logging instrument operates autonomously when downhole to record pressure and/or acceleration values during the withdrawal or advancing operation without requiring additional control input from the operator at the surface other than controlling withdrawal or advancing of the logging instrument.

16. The method of claim 15, wherein the logging instrument samples pressure values at predetermined time intervals.

17. The method of claim 16, further comprising using detection of acceleration or lack of acceleration as a signal to obtain a said next pressure value.

18. The method of claim 17, further comprising ceasing sensing pressure for a period of time until acceleration is at or above a threshold value.

19. The method of claim 1, wherein the logging instrument comprises a memory that stores data recorded by the logging instrument, and wherein the method further comprises:
retrieving the logging instrument from the borehole; and
transmitting the recorded data from the memory of the logging instrument to a handheld device.

20. The method of claim 19, wherein the recorded data is wirelessly transmitted from the memory of the logging instrument to the handheld device.

* * * * *